Nov. 15, 1960                    A. D. CAMERON                    2,959,810
          MECHANICAL APPARATUS FOR REMOVING THE
                  HEAD OF COD AND LIKE FISH
Filed Nov. 29, 1956                                             3 Sheets-Sheet 1

Inventor
A. D. Cameron

Nov. 15, 1960 A. D. CAMERON 2,959,810
MECHANICAL APPARATUS FOR REMOVING THE
HEAD OF COD AND LIKE FISH
Filed Nov. 29, 1956 3 Sheets-Sheet 3

Inventor
A. D. Cameron
By Glascot Downing Seebold
Attys

United States Patent Office 2,959,810
Patented Nov. 15, 1960

2,959,810

MECHANICAL APPARATUS FOR REMOVING THE HEAD OF COD AND LIKE FISH

Anthony D. Cameron, Aberdeen, Scotland, assignor of one-half to Fisadco Limited, London, England, a British company Filed Nov. 29, 1956, Ser. No. 625,039

7 Claims. (Cl. 17—4)

Ths invention relates to an improved mechanical apparatus for removing the head of cod and like fish with the minimum removal of flesh, and relates to that class of severing apparatus in which a pair of rotary disc knives on parallel or inclined spindles cut through the fish on opposite sides thereof.

In severing apparatus of this class it has heretofore been usual to employ disc knives which cut through the fish along an inclined cutting plane behind the gills of the fish, in which case portions of the edible flesh are removed with the head, especially if the plane of the cut is so arranged as to remove the paired anterior or pectoral fins.

The object of the present invention is to provide severing apparatus of the class described which will remove the head with the paired anterior fins without removing the edible flesh portions which lie respectively above and in front of the anterior fins and below the said fins. This method of heading has hereto only been accomplished by skilled hand cutting.

According to the present invention, the apparatus comprises a pair of conical or concave rotary disc knives, with their concavities facing in the same direction, means co-operating with the knives for gripping the head of the fish adjacent the cutting point of the knives and drawing the fish between the knives so that they cut in a rearwardly curved path until directly behind the joint of the anterior fins with the body, the body of the fish then being allowed to swing with respect to the head, approximately about the cutting point of the knives, so that they then continue to cut in a forwardly curved path.

There may be a stationary V-shaped cutter located below the cutting point of the rotary knives, with its hollow side facing the body of the fish, the fish being forced on to the cutter by the gripping means to complete the severance of the head.

Means may be provided for spreading the anterior fins prior to and/or during the severing operation.

In order to enable the knives to grip the fish as it passes between them and also in order to ensure crushing of the backbone or severance thereof, each knife includes a rotary cylindrical or disc-like gripping member at the hollow side of the knife, this member being of a diameter less than the diameter of the cutting edge of the knife, and being located axially beyond the cutting plane of the knife, to press against the head of the fish.

Guides may be provided at each side of the head and/or body of the fish to hold it steady during the cutting operation.

One embodiment of an apparatus according to the present invention for removing the heads of cod and like fish is illustrated by way of example in the accompanying drawings, in which:

Figure 2a is a fragmental view, partly in side elevation and partly in section, showing one of the knife-carrying shafts being inclined downwardly.

Figures 5, 6:
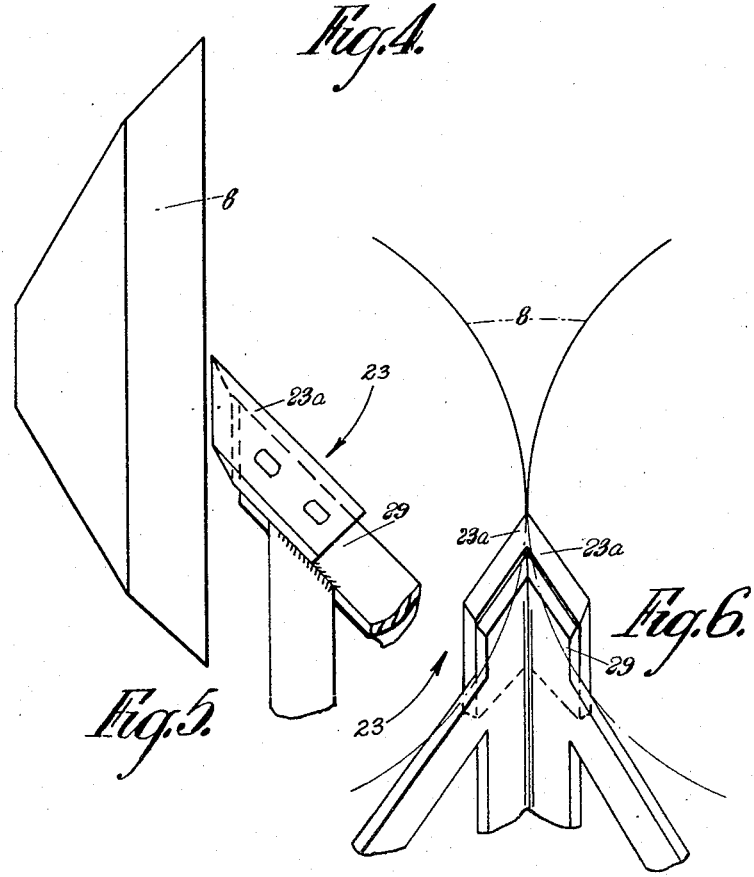
Figure 5 is a side view of the V-shaped cutter and rotary knives.

Figure 6 a front view showing a stationary cutter co-operating with the rotary knives.

Figure 1:
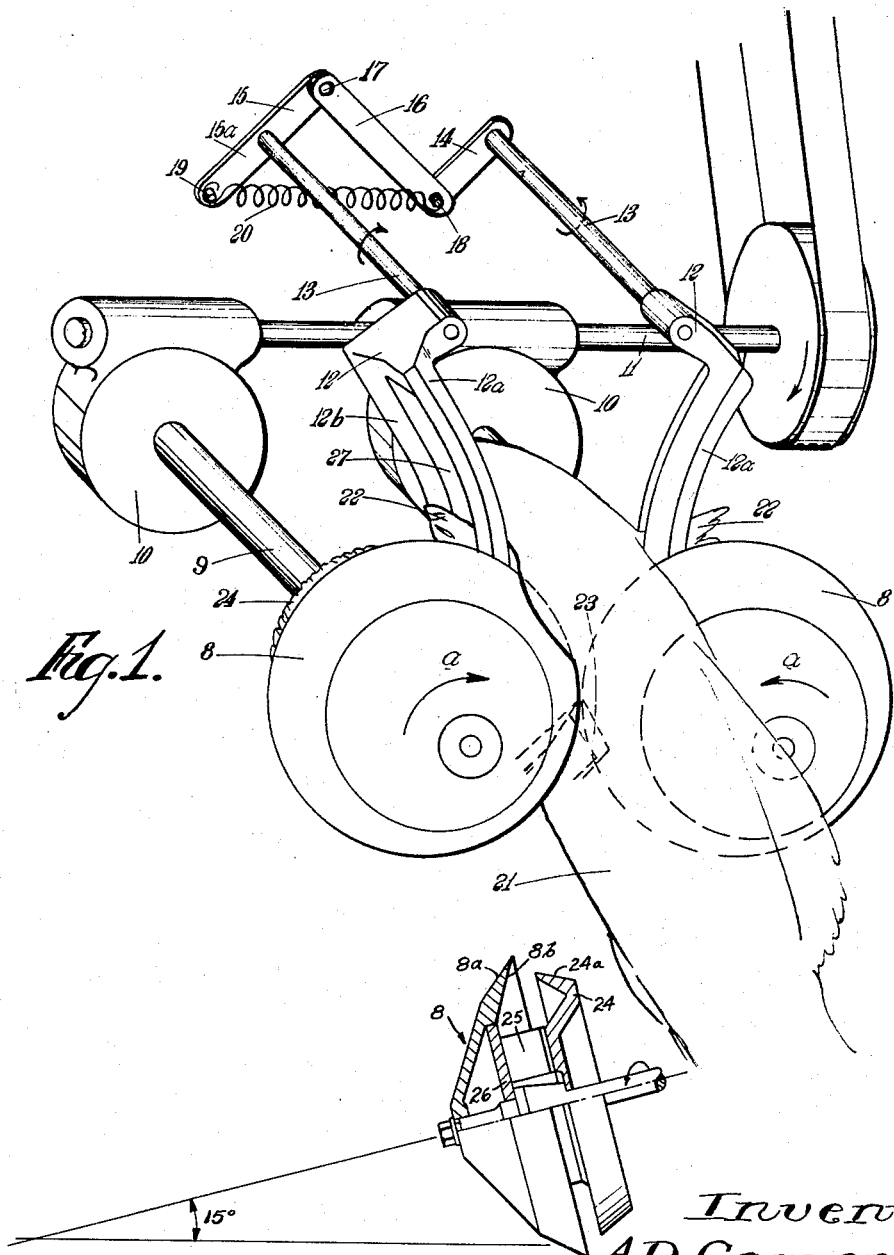
Figure 1 is a diagrammatic illustration of the general assembly of essential parts of the heading apparatus as seen from above and in front of the apparatus. The machine framework and casings are omitted for convenience of illustration and a fish is shown between the knives and guides.

The apparatus comprises a pair of conical rotary knives 8 secured on the forward ends of parallel or nearly parallel shafts 9 driven by any convenient mechanism to cause the knives 8 to rotate in opposite directions as indicated by the arrows *a* in Figure 1, whereon the shafts are shown as being driven through worm and worm wheel reduction gearing 10 from a power shaft 11. A pair of fin guides 12 are mounted on the ends of two rotatable, parallel rods 13. The rods 13 are interconnected by a linkage means including two arms 14 and 15, with each arm being connected with one of the rods 13, and a link 16 being interconnected to the arms 14 and 15 in a pivotal manner, as shown at 18 and 17, respectively. The arm 15 is provided with an extension 15a, and the extension 15a is interconnected with the pivot means 18 by a spring 20, which spring is connected to the link 15a by a pin 19. As a result, the arms can only move together and by approximately equal angles in opposite directions. Thus the guides 12 must open in unison and are self-centering. The spring 20 urges the guides 12 into a closed position until the weight of a fish pushes them apart. There is a small gap as for example a few thousandth parts of an inch between the adjacent edges of the revolving knives 8.

In Figure 1 the fish is represented at 21 with its pectoral fins 22 engaged in slots in the guides 12 and the position of the stationary cutter is indicated at 23. It will be noted that the point of the cutter 23 is adjacent the gap beween the knives 8 and the point where the edges of the knives 8 most closely approach each other is what can be termed a "cutting point."

The fish is fed to the knives in any convenient manner so that the fish initially assumes the position shown in Figure 1. The shafts 9 may be horizontal, but are preferably inclined downwards towards their ends which carry the knives 8 as illustrated in Figure 2a. The angle of inclination may be of the order of 15° to 30°, and may be upwards instead of downwards.

Figure 2:
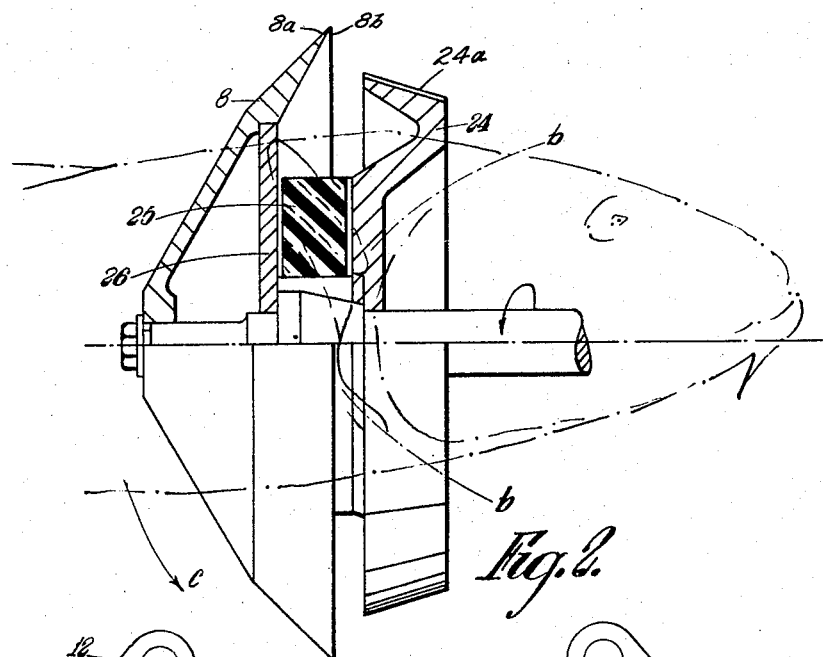
Figure 2 is a half side elevation and half vertical sectional view of one of the rotary knives showing also the outline of a fish being operated upon.

Referring now to Figure 2, a disc member 24 with serrations or projecting lugs 24a around its circumference is connected to each rotary knife 8 by means of a resilient coupling 25, e.g. of rubber, which connects the disc member 24 to a disc or the like 26 which is secured within the hollow side of the knife 8. The disc member 24 is preferably slightly tapered in a direction away from the knife 8 and is grooved or otherwise serrated on its circumference to grip the fish during the cutting operation which takes place substantially along the curved broken line b—b in Figure 2 in the direction of the arrow c as cutting proceeds and the fish is released by the attendant as hereinafter explained.

Figure 3:
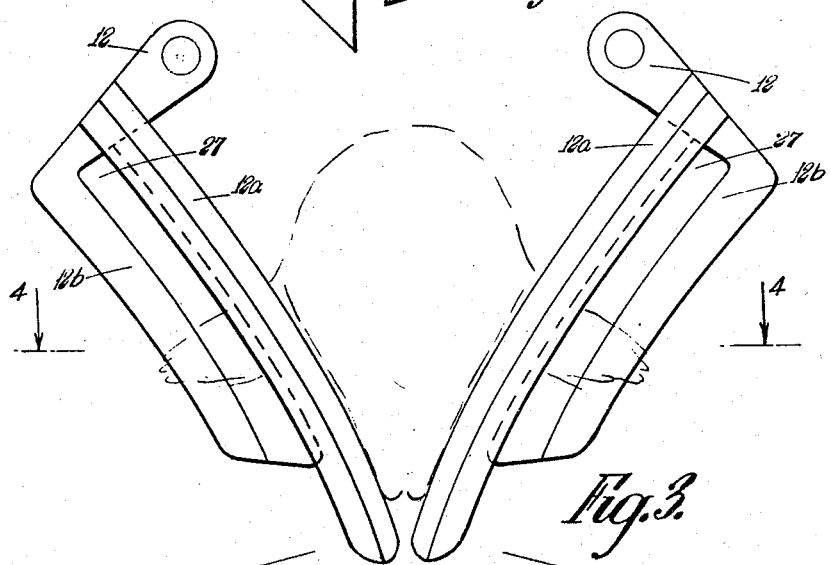
Figure 3 is a front view of the guides showing a fish in sectional outline between the guides.
Figure 4:
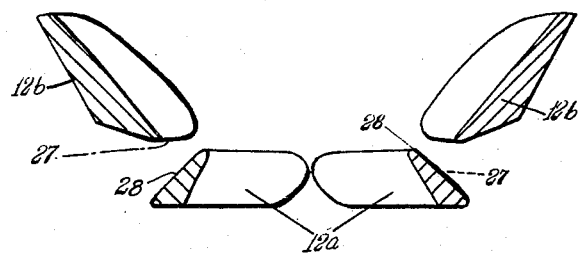
Figure 4 is a sectional view taken on the line 4—4 of Figure 3, the view looking in the direction of the arrows and the sectional outline of the fish being omitted.

Figures 3 and 4 illustrate the guides for receiving the fish and for engaging and opening out the pectoral fins. When feeding the fish to the machine, the fish is placed head-first between the guides 12 with its pectoral fins in advance of the guides, each of which has a slot 27 dividing the guide into guide fingers 12a and 12b. The slot 27 is inclined to produce an acute-angled leading edge 28 on the rear finger 12a. When the fish is drawn by its tail through the guides, the acute-angled leading edges 28 scrape along the belly flaps of the fish and engage under the pectoral fins, which enter the slots 27, thus spreading the fins and stopping the backward movement of the fish at the correct point for cutting by means of the knives 8. The fish is then released and descends between the guides on to the knives. Should a pectoral fin have been broken in previous handling, the dislocated joint is engaged by the edge 28 of the guide and checks the backward movement of the fish at the correct point.

In Figures 5 and 6 there is illustrated a preferred construction of stationary V-shaped cutter 23 positioned between the rotary knives 8. The cutter 23 consists of a pair of knife blades 23a adjustably secured to the oppositely inclined sides of a cutter support 29 so that the blades 23a are inclined outwards and downwards and meet at a point just below the point at which the rotary knives meet.

The method of operating upon a fish is as follows:
When the fish is inserted by hand through a slot in an outer casing (not shown) with the head of the fish between the guides 12 and its pectoral fins in advance of the guides, the fish is drawn back by its tail until its pectoral fins are opened out as already described with reference to Figures 3 and 4. As the head of the fish descends, it is gripped by the serrated disc members 24 of the rotary knives 8 and drawn through the knives. The body of the fish now swings downwards in the direction of the arrow c in Figure 2. This causes the knives 8 to cut along the arcuate line b—b in Figure 2, severing the head from the body of the fish along a line which leaves a minimum amount of edible flesh on the head, since the knives 8 commence their cut at a point below and in advance of the joint of the pectoral fin to the body, the line of the cut gradually receding as it moves upwards to and behind the pectoral fins, whereupon the rapid downward swing of the tail and body of the fish causes the line of cut to advance rapidly forwards towards the cranium of the fish.

It is desirable that the rotary knives 8 should have their cutting edges 8a and 8b (Figure 2) sharpened to an angle of about 15° between them, but it has been found that a sharp cutting edge is not necessary, and it is preferred that the cutting edge be slightly blunt.

The purpose of the stationary cutter 23 is to remove any skin which connects the head of the fish to the body and which remains uncut after having passed between the rotary knives 8. This skin must pass down one side or the other of the point of the blades 23a and is severed by the sharpened edges thereof. As the cutter 23 is located so that the blades 23a meet at an angle and are open underneath and by reason also of the fact that the cutter support 29 is inclined downwards and away from the rotary knives 8, the body of the fish is free to swing downwards and under the blades 23a without interfering with the severing of the head of the fish.

What I claim is:
1. An apparatus for removing the head of a cod or similar fish, comprising a pair of parallel shafts arranged for rotation about substantially horizontal axes, means to rotate the shafts in opposite directions, a concave rotary disc knife on each shaft with the edges of the knives being spaced a small distance apart and with the concavities facing in the same direction, a rotary gripping member on each shaft at the same side and adjacent the concavity of the knife and being of less diameter than the knife, resilient means coupling each gripping member to each disc knife, a pair of guides located on the same side of the knives as the gripper members, each guide having a slot therein for receiving and spreading out a pectoral fin, and a stationary V-shaped cutter positioned below the cutting point of the disc knives with its hollow side facing the concavities of the disc knives, each of the gripping members serving to grip a side of the head of the fish with the body of the fish extending beyond the disc knives and, upon rotation of the shafts, drawing the head between the disc knives, with the weight of the body of the fish rocking the body downwardly about the gripping members so that the cut is made around the pectoral fins in a curve and the flesh on the back of the head is maintained on the fish body.

2. An apparatus for removing the head of a cod or similar fish, comprising a pair of rotary knives rotatable on parallel, substantially horizontal axes with the peripheral edges thereof being spaced apart a small distance, means above and cooperable with the rotary knives adapted to coact with the head and pectoral fins of the fish to position and guide the fish so that the belly of the fish is presented to the knives immediately behind the pectoral fins, rotatable means cooperable with each knife to grip each side of the head of the fish and drive the fish between the knives whereby the knives cut behind the pectoral fins and with the weight of the fish rocking the fish body downwardly about the rotatable means so that the cut is made around the pectoral fins in a curve and the flesh on the back of the head is maintained on the body.

3. An apparatus of the type set forth in claim 2, in which each knife is a conical disc and the rotatable means is a cylindrical member of lesser diameter than the knife spaced from and facing the concavity of the disc, and means resiliently coupling the cylindrical member to the conical disc whereby the member and disc rotate in unison.

4. An apparatus of the type set forth in claim 3 further including a stationary V-shaped cutter positioned immediately below the cutting point of the disc knives and inclined to the horizontal to receive the partly cut head of the fish and turn the same to bring the said rotary cut closer to the mouth of the fish.

5. An apparatus as claimed in claim 2 in which the positioning and guide means includes a pair of spaced apart components located on the same side of the rotatable means, and each component having a longitudinal slot therein for receiving and spreading out a pectoral fin.

6. An apparatus for removing the head of a cod or similar fish, comprising a pair of parallel shafts, means to rotate the shafts in opposite directions, a concave rotary disc knife on each shaft with the edges of the knives in a common plane and with the concavities facing in the same direction, a stationary V-shaped cutter positioned with its point adjacent the cutting point of the disc knives and having a surface inclined at an acute angle to said common plane, and means for forcing a fish between said rotary knives and onto said cutter with its head on the concave side of said knives, whereby the head of the fish moves over said inclined surface and is turned in relation to the body of the fish while the cutting action proceeds.

7. An apparatus for removing the head of a cod or similar fish, comprising a pair of rotary knives having the peripheral edges thereof spaced apart a small distance, means cooperable with the rotary knives adapted to coact with the head and pectoral fins of the fish to position and guide the fish so that the belly of the fish is presented to the knives immediately behind the pectoral fins, means cooperable with each knife to force the fish between the knives whereby the knives cut behind the pectoral fins, and a stationary V-shaped cutter positioned immediately adjacent the cutting point of the rotary knives and having a surface inclined to the direction of movement of the fish under the action of the forcing means to receive the partly cut head of the fish and turn the same to bring the said rotary cut closer to the mouth of the fish.

References Cited in the file of this patent

UNITED STATES PATENTS

| | | |
|---|---|---|
| 284,823 | Cottrell | Sept. 11, 1883 |
| 331,451 | Scott | Dec. 1, 1885 |
| 1,632,200 | Stafford | June 14, 1927 |
| 2,497,554 | Meissner | Feb. 14, 1950 |
| 2,584,567 | Fonken et al. | Feb. 5, 1952 |